United States Patent [19]

Schlenk

[11] Patent Number: 5,072,159
[45] Date of Patent: Dec. 10, 1991

[54] LAMP DRIVER CIRCUIT

[76] Inventor: Robert B. Schlenk, 3502 Dell Rd., Louisville, Ky. 40299

[21] Appl. No.: 447,226

[22] Filed: Dec. 7, 1989

[51] Int. Cl.$^5$ .............................................. H05B 41/16
[52] U.S. Cl. ..................... 315/278; 315/226; 315/289; 315/DIG. 7; 331/110
[58] Field of Search ............... 315/219, 226, 229, 278, 315/DIG. 7, 289, 129; 331/112, 113 A, 108 R, 114

[56] References Cited

U.S. PATENT DOCUMENTS

| | | | |
|---|---|---|---|
| 2,982,881 | 5/1961 | Reich | 315/205 |
| 3,432,723 | 3/1969 | Miller et al. | 315/206 |
| 3,467,887 | 9/1969 | Skirvin | 331/112 |
| 3,737,756 | 6/1973 | Hasley et al. | 331/113 A |
| 3,743,918 | 7/1973 | Maitre | 321/44 |
| 3,863,180 | 1/1975 | Parson | 331/113 A |
| 4,005,335 | 1/1977 | Perper | 315/224 |
| 4,017,785 | 4/1977 | Perper | 321/4 |
| 4,071,807 | 1/1978 | Ichinose | 315/219 |
| 4,104,620 | 8/1978 | Cronin | 315/129 |
| 4,172,981 | 10/1979 | Smith | 307/66 |
| 4,201,957 | 5/1980 | Cathell | 331/113 A |
| 4,254,362 | 3/1981 | Tulleners | 315/219 |
| 4,388,561 | 6/1983 | Koshimura et al. | 315/171 |
| 4,572,990 | 2/1986 | Leale et al. | 315/220 |
| 4,667,132 | 5/1987 | Leale et al. | 315/382 |
| 4,700,113 | 10/1987 | Stupp et al. | 315/DIG. 7 |

FOREIGN PATENT DOCUMENTS 2610944 9/1977 Fed. Rep. of Germany .
2047486 11/1980 United Kingdom .

Primary Examiner—Eugene R. LaRoche
Assistant Examiner—Son Dinh
Attorney, Agent, or Firm—Wood, Herron & Evans

[57] ABSTRACT

A lamp driver circuit includes a high voltage secondary winding connectable to a gas discharge lamp. The secondary is wound on a magnetic core together with a pair of primary windings. The primary windings are coupled to one another as well as to an R-C network and an amplifier stage, the latter of which comprises a plurality of fast-switching transistors connected in parallel with one another. The bases of each of the transistors are connected to the R-C network by way of an element such as an incandescent lamp filament whose resistance varies with the current through the element.

16 Claims, 1 Drawing Sheet

LAMP DRIVER CIRCUIT

FIELD OF THE INVENTION

The invention relates to a high voltage driver circuit for powering gas discharge lamps. More particularly, the present invention relates to a single-ended blocking oscillator lamp driver which includes a pair of primary windings driven by a plurality of transistors connected in parallel with one another, each transistor having a current-variable resistive element in series with its base.

BACKGROUND OF THE INVENTION

In the prior art, it has long been known to power a gas discharge lamp such as a neon lamp or fluorescent tube from an A.C. source by means of a conventional voltage step-up transformer or ballast. These devices suffer from a number of drawbacks. To power lamps of significant size, bulky and heavy copper windings formed on massive magnetic cores, usually of a laminated silicon steel are usually required. In addition to being relatively expensive, such construction may require the use of thermal protection to safeguard against overheating. Increased weight and bulk impose difficulty in mounting the driver circuitry in an aesthetically pleasing manner in lighted signs, displays, fixtures or the like. Units operating from ordinary line voltage are also often subject to a tendency to generate significant radio frequency interference as well as an annoying audible hum and are not readily dimmable.

In an attempt to overcome the aforementioned limitations, there have arisen in the prior art a number of gas discharge lamp drivers incorporating smaller and less massive transformers switched by semiconductor devices at high, inaudible frequencies. Such drivers may be powered either directly from a D.C source or from an A.C. source by way of A.C. to D.C. converter circuitry. For example, U.S. Pat. No. 3,467,887 to Skirvin shows both A.C. and D.C. powered circuits in which a transformer, whose secondary is connected to a gas discharge lamp, includes at least two primary windings. The primary windings are coupled to a switching transistor and diode to form a regenerative oscillator operating at a frequency above the audible range.

U.S. Pat. No. 2,982,881 to Reich shows lamp power supplies of the regenerative, single transistor type as well as types wherein the transformer primary is connected to a pair of transistors in a push-pull arrangement. However, units of the latter type also generate excessive radio frequency interference and are subject to reduced light output in cold operating environments. The latter problem has also been known to exist in the step-up transformer type drivers discussed above.

In each of the aforementioned circuits, the maximum current which can be driven through the primary winding is limited by the rating of a single transistor. In order to adapt these circuits to handle more power, a transistor of a higher power rating would be required. Unfortunately, the switching speed of bipolar transistors ordinarily decreases as the power rating of the transistor decreases. The cost of bipolar transistors also generally increases disproportionately with increases in power rating. Because most of the power dissipation of a transistor operating in a blocking oscillator takes place as the transistor changes its conductive state from conducting to non-conducting, higher power circuits have heretofore been less efficient as well as disproportionately more expensive than their lower power counterparts.

German Offlenlegungsschrift No. 26 10 944 discloses a blocking oscillator fluorescent lamp ballast. The ballast includes a pair of primary windings coupled to one another by way of a pair of bipolar transistors, the latter of which are connected in parallel with one another to improve efficiency by reducing the internal resistance of the oscillator. However, unless more expensive matched transistors are used, the base circuit of at least one of the transistors must be connected to a resistor of low ohmic value selected to equalize the load on both transistors. The need to trim a resistance value to match the load on the transistors is an impediment to low cost manufacturing of the circuit.

SUMMARY OF THE INVENTION

In view of the foregoing drawbacks of the prior art, it is an object of the present invention to provide an improved gas discharge lamp driver circuit in the form of a blocking oscillator which operates efficiently and is economical to manufacture and which does not require individual trimming of resistance values.

It is a further object of the invention to provide a blocking oscillator lamp driver circuit driven by a plurality of paralleled transistors whereby a given load may be driven using transistors of significantly lower power rating than would be required of a single transistor driving the same load and whereby the power output of the circuit may conveniently and economically be increased by paralleling additional transistors of such lower power rating.

It is a further object of the invention to provide such a lamp driver circuit which may be packaged compactly, is light in weight, which operates quietly, is not subject to overheating, can readily be adapted for dimming, is adaptable for A.C. or D.C. operation which is not subject to reduced light output in cold operating environments and which does not generate objectionable levels of radio frequency interference.

In accordance with the invention, a blocking oscillator includes a high voltage secondary winding connectable to the lamp to be driven. The secondary is wound on a lightweight magnetic core together with a pair of primary windings. The primary windings are connected in series with one another at a common point which is coupled to the output of an amplifier stage. The other end of the first primary winding is connectable to one terminal of a source of low voltage D.C. current, which can be varied to effect dimming and which can, if desired, be supplied from a D.C. power supply connected to an A.C. source. The other end of the second primary winding is connected to the other terminal of the D.C. source through an R-C network which provides feedback to the amplifier. The amplifier comprises a plurality of fast-switching transistors connected in parallel with one another. The bases of each of the transistors are connected to a common point by way of an element such as an incandescent lamp filament whose resistance varies with the current through the element. Such an element has been found to be an excellent base current limiter, which due to its self-regulating action of the element improves the uniformity of load sharing among the transistors particularly during the high-power dissipation phase as the transistors switch from their saturation regions to their cutoff regions. The power output of the circuit can readily be increased by connecting additional transistors in parallel, each additional transistor also including a current-variable resistive element in series with its base.

These and other aspects and advantages of the invention will become clear to those skilled in the art upon review of the following description of the preferred embodiment of the invention and the accompanying drawings.

DESCRIPTION OF THE PREFERRED EMBODIMENT

Figure 1:
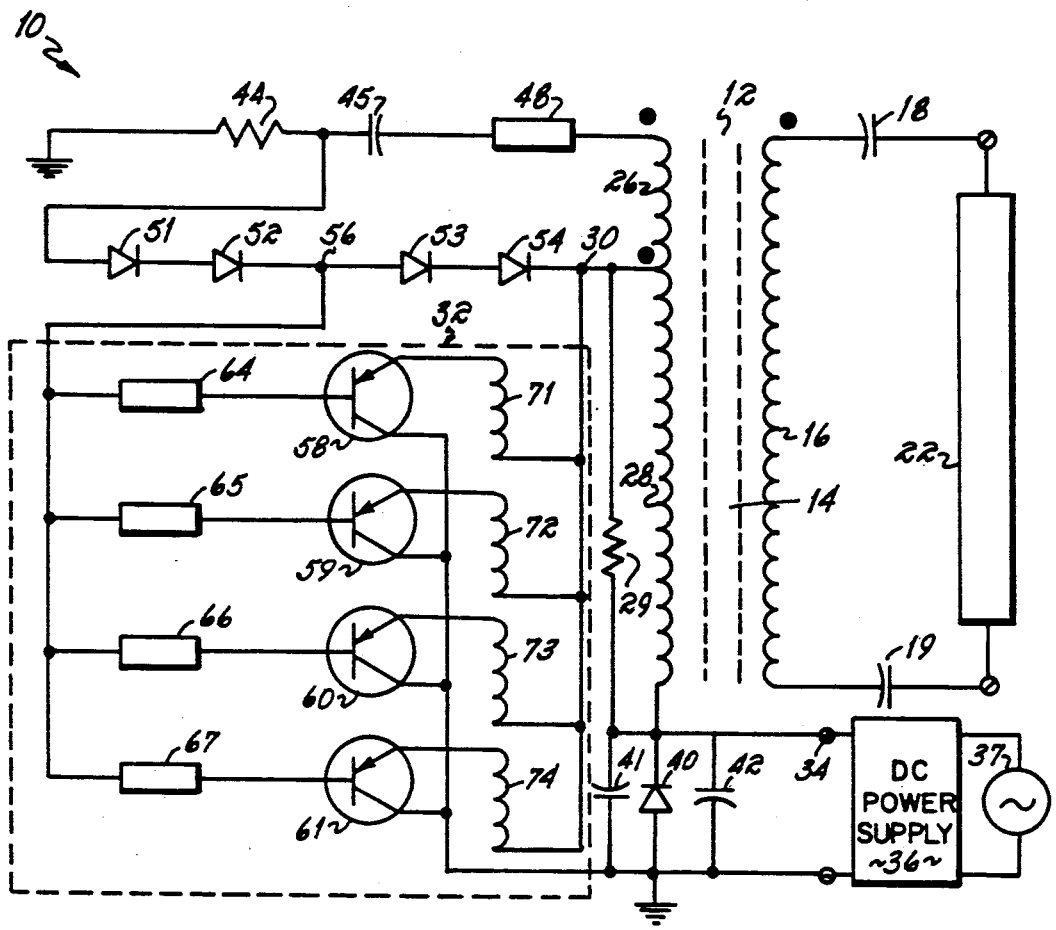
FIG. 1 is an electrical schematic diagram of a preferred embodiment of the invention.

Referring now to FIG. 1, a lamp driver circuit 10 constructed in accordance with the present invention includes a transformer 12 wound on a core 14 of lightweight high magnetic permeability material. Core 14 may suitably comprise a type such as part number PR-12 available from Permacore of Oak Lawn, Ill. which is cylindrical in shape and approximately one half inch in diameter and two inches in length. Core 14 carries a high voltage secondary winding 16 of five thousand turns of #34AWG wire, the ends of which are connected by way of series capacitors 18 and 19 to a neon tube 22. Tube 22 may comprise up to fifty feet of nine millimeter or larger diameter neon filled tubing. Core 14 also carries a first primary winding 26 of fifteen turns of #24AWG wire and a second primary winding 28 of ten turns which is preferably shunted by a resistor 29. Preferably, each turn of the second primary winding is made up of four separate but closely adjacent #23AWG conductors wound in parallel. Preferably, the second primary winding 28 is wound most closely adjacent the surface of core 14. Winding 26 is then wound atop winding 28 while secondary winding 16 is wound atop both windings 26 and 28. An insulating layer should be provided between each layer of secondary windings. The sense in which windings 16, 26 and 28 are wound with respect to one another is illustrated in FIG. 1 using standard dot notation.

One end of windings 26 and 28 are connected at a node 30 which is also connected to the output of an amplifier stage 32. The end of winding 28 opposite node 30 is connected to the positive terminal 34 of a D.C. power supply 36 which may be of a type variable from about eighteen volts to about six volts in order to dim tube 22. Power supply 36 may be conveniently supplied from an A.C. source 37 and is preferably shunted by a protective network formed by connecting a diode 40 and two capacitors 41 and 42 as shown. The end of winding 26 opposite node 30 is connected to ground through an R-C network comprised of a resistor 44, a capacitor 45 and the filament of a fourteen volt, 400 milliamp rated incandescent bulb 48 which serves as a current limiter as well as a convenient means of indicating that circuit 12 is in operation.

Amplifier stage 32 includes four silicon diodes 51, 52, 53 and 54 connected to one another in series anode to cathode. The anode of diode 54 is connected to node 30 while the cathode of diode 51 is connected between resistor 44 and capacitor 45. Diodes 52 and 53 connect at a node 56 which connects to the bases of four respective PNP transistors 58, 59, 60 and 61 by way of a respective current-variable resistive element 64, 65, 66 and 67. Preferably, elements 64, 65, 66 and 67 each comprise a five volt 0.115 milliamp rated incandescent bulb. Elements 64–67 serve as base current limiters and also to improve the uniformity of load-sharing among transistors 58–61, particularly as they switch from a conducting state to a non-conducting state. In order to provide most efficient operation, transistors 58–61 should comprise a fast switching type. Four Motorola type D45VH10 transistors, each having a rated typical fall time on the order of one hundred nanoseconds, a maximum $V_{CEO}$ of about 80 Vdc and a total power dissipation rating of about 50 watts have been found to provide excellent results driving a neon tube 22 of the dimensions described above. The collectors of transistors 58–61 are connected in common to the ground of supply 36. The emitters of transistors 58–61 are connected in parallel with one another and connected in common with the anode of diode 54. Preferably, but optionally, a respective one of a plurality of coils 71, 72, 73 and 74 is connected in series between the emitter of each respective transistor 58, 59, 60 and 61 and the anode of diode 54. Each coil 71–74 may suitably comprise a seven inch length of #28AWG wire wound to form an air-cored coil approximately ¼ inch in diameter.

In operation, circuit 10 undergoes free-running periodic oscillations which will now be described with reference to FIG. 2 which illustrates four phases, (a), (b), (c) and (d) characteristic of each oscillatory cycle. However, before considering such steady-state operation, it shall first be assumed that D.C. power has just been applied to circuit 10.

Initially, current begins to flow from power supply terminal 34 through primary coil 28 toward node 30. That current induces a positive voltage across winding 26. Consequently, a negative voltage appears across the base-emitter junctions of transistors 58–61 tending to bias them into saturation. As the current flowing from emitter to collector of each transistor rapidly increases, the emitter to collector voltage settles to a saturation value very near zero volts to define a transistor conduction phase illustrated in FIG. 2 at (a). During phase (a), the base to emitter voltages across each transistor settle to a saturation level of about −1 volt. During this phase, capacitor 45 charges thereby elevating the voltage at the base of each transistor 58–61.

The rate of increase of the current flowing through winding 28 decreases thereby decreasing the magnitude of the induced voltage across winding 26. Once the voltage across winding 26 is balanced by the voltage across capacitor 45, capacitor 45 stops charging. As the base to emitter voltage of transistors 58–61 rises slightly above the saturation level, the emitter current decreases slightly. In response, a small negative voltage is induced across winding 26 to further bias transistors 58–61 toward non-conduction. The above positive feedback process continues rapidly as illustrated in phase (b) of FIG. 2 until transistors 58–61 are completely cutoff. The rapid voltage rise as the transistors switch from a conducting state to a non-conducting state causes high voltage pulse to appear across secondary winding 16 to energize lamp 22. Coils 71–74 limit the magnitude of the peak voltage appearing across the collector-emitter junctions of transistors 58–61 to values low enough to avoid damage to the transistors. Diodes 51–54 protect transistors 58–61 from zener breakdown, block excessive voltage spikes from the bases of the transistors and provide a path through which capacitor 45 can discharge. During phase (b) of FIG. 2, circuit 10 is subject to damped oscillations which are filtered by capacitors 41 and 42 to mitigate the generation of undesirable radio frequency interference.

Figure 2:
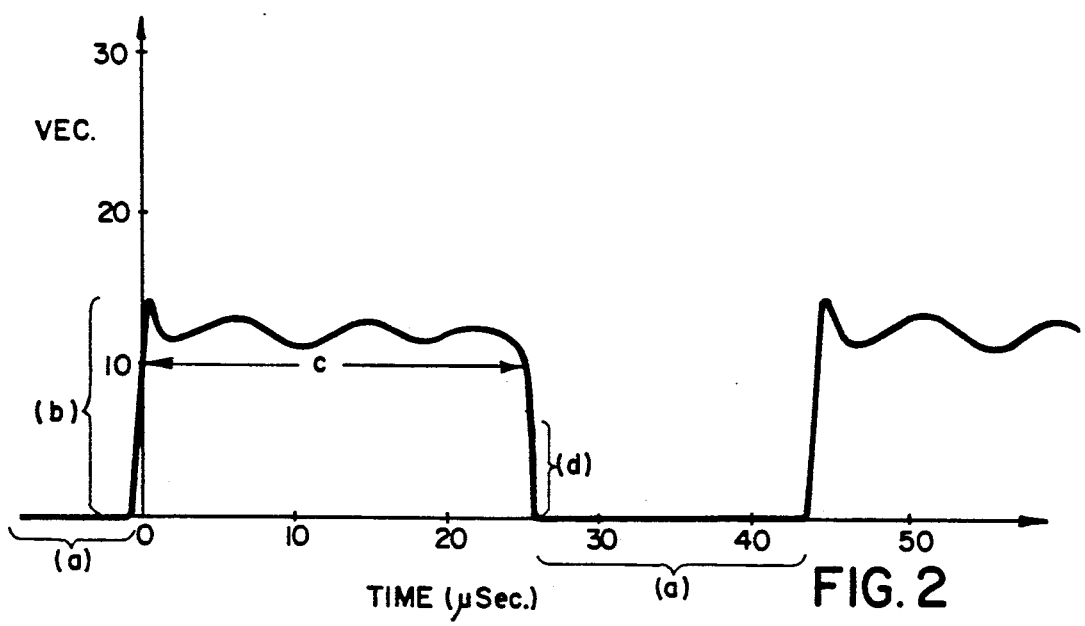
FIG. 2 is the waveform appearing across the emitter-collector junction of one of the transistors in the embodiment of FIG. 1.

A pulse formation phase, illustrated at (c) in FIG. 2, then ensues. During this phase, capacitor 45 discharges via diodes 51–54 and the emitter-collector waveform displays ripples due to the changes in the impedance of tube 22 being reflected back through the secondary winding 16. The emitter voltages fall as the magnetic field associated with winding 26 collapses.

A pulse decay phase indicated at (d) of FIG. 2 commences as the voltage appearing at the emitters of transistors 58–61 fall below the corresponding base voltages. A current begins to flow through winding 26 toward the emitters of the transistors inducing a voltage across winding 26 tending to further rapidly bias transistors 58–61 into full conduction through positive feedback whereupon the conduction phase (a) described above recommences.

In the event it is desired to increase the power output of circuit 10 as may be desired for example to drive a greater length of neon tube, one or more additional transistors of the same type as transistors 58–61 can be connected in parallel with transistors 58–61. To do so, one end of a current-variable resistive element of the type used for elements 64–67 is connected in series with the base of each such additional transistor and the opposite end of that element connected to node 56. The emitter of each additional transistor is then tied to node 30, preferably by way of a coil of a type like coils 71–74, while the collector of each additional transistor is connected to ground.

Table I below sets forth a parts listing for the preferred embodiment illustrated in FIG. 1:

TABLE I

| Parts Listing | |
|---|---|
| Resistor 29 | 500 ohm, 1 watt wirewound |
| Capacitor 45 | .22 microfarad/35 Volt |
| Resistor 44 | 10 Kilohm, ½ watt |
| Diodes 51–54 | 1000 P.I.V./2.5 Amp. |
| Transistors 58–61 | Motorola D45VH10 or equivalent |
| Capacitor 41 | .1 microfarad/35 Volt |
| Capacitor 42 | 6300 microfarad/40 Volt |
| Diode 40 | 1000 P.I.V./2.5 Amp. |
| Elements 64–67 | .115 milliamp/5 Volt incandescent lamp |
| Bulb 48 | 400 milliamp/14 Volt incandescent lamp |
| Coils 71–74 | ¼" diameter air cored coil of 7 inches #28 AWG wire |
| Transformer 12 | |
| Core 14 | Permacore PR-12 |
| Secondary Winding 16 | 5000 turns |
| Primary Winding 28 | 10 turns |
| Primary Winding 26 | 15 turns |
| D.C. Power Supply 36 | 6–18 V.D.C. |

While the circuit described above constitutes a preferred embodiment of the invention and represents the best-mode currently contemplated by the inventor for carrying out the invention, it is to be understood that the invention is not limited to that particular circuit. In light of the present disclosure, various alternative embodiments and equivalents will be apparent to persons skilled in the art. For example, circuits utilizing a plurality of NPN transistors as well as circuits adapted for driving fluorescent or other types of gas discharge lamps can be constructed by a person or ordinary skill in the art given only routine skill and the disclosure contained herein. Other circuits may also be constructed without departing from the full legal scope of the invention as defined by the appended claims and legal equivalents covered thereby.

What is claimed is:

1. A circuit for driving a lamp, comprising:
    a magnetically permeable core;
    a high voltage secondary winding wound around said core, said secondary winding being connectable to the lamp; and
    a circuit connectable to a D.C power source, said circuit being magnetically coupled to said secondary winding to induce a voltage thereacross sufficient to light the lamp, said circuit including a pair of series-connected windings wound around said core, an R-C network and a plurality of parallel-connected transistors coupled to said windings and said R-C network, each respective transistor having a base terminal connected to said R-C network by way of a respective current-variable resistive element.

2. The circuit of claim 1 further comprising a coil connected between each of said transistors and a node common to each of said series-connected windings.

3. The circuit of claim 1 wherein said lamp comprises a neon lamp.

4. The circuit of claim 1 further comprising at least one diode connected between said R-C network and a node common to each of said series-connected windings.

5. The circuit of claim 1 wherein said at least one diode is connected to a node commonly connected to each of said current-variable resistive elements.

6. The circuit of claim 1 wherein at least one of said current-variable resistive elements comprises an incandescent lamp.

7. The circuit of claim 1 wherein said D.C. power source is a source variable over an output range sufficient to permit said lamp to be selectively dimmed.

8. The circuit of claim 1 wherein said transistors each comprise a PNP transistor.

9. The circuit of claim 1 wherein said plurality of transistors comprises at least three discrete transistors.

10. A circuit for driving a lamp, comprising:
    a magnetically permeable core;
    a high voltage secondary winding wound around said core, said secondary winding being connectable to said lamp;
    a first primary winding wound around said core, said primary winding having a first end and a second end;
    a second primary winding wound around said core, said second primary winding having a third end and a fourth end, said third end being connected to said second end at a first node, said fourth end being connectable to one side of a D.C. power supply;
    an R-C network connected between said first end and an opposite side of said D.C. power supply, said network including at least one resistor and one capacitor connected to one another at a second node;
    a plurality of transistors connected in parallel with one another, each of said transistors including a base terminal, a second terminal and a third terminal, each of said base terminals of each of said transistors being coupled to said second node, said second terminals of each of said transistors being coupled to said first node, and said third terminals of said transistors being coupled to said opposite side of said D.C. power supply; and a current-variable resistive element connected in series with at least one of said base terminals of a corresponding one of said plurality of transistors.

11. The circuit of claim 10 further comprising at least one diode connected between said first node and said second node.

12. The circuit of claim 10 wherein said at least one diode is coupled to said base terminals.

13. The circuit of claim 10 further comprising a plurality of diodes connected in series with one another, said series being connected between said first node and said second node.

14. The circuit of claim 10 further comprising a coil connected between said opposite side of said D.C. supply and said second terminal of at least one of said transistors.

15. A circuit for driving a lamp, comprising:

a magnetic permeable core;

a high voltage secondary winding wound around said core, said secondary winding being connectable to said lamp;

a first primary winding wound around said core, said primary winding having a first end and a second end;

a second primary winding wound around said core, said second primary winding having a third end and a fourth end, said third end being connected to said second end at a first node, said fourth end being connectable to one side of a D.C. power supply and R-C network connected between said first end and an opposite side of said D.C. power supply, said network including at least one resistor and one capacitor connected to one another at a second node;

a plurality of transistors connected in parallel with one another, each of said transistors including a base terminal, a second terminal and a third terminal, each of said base terminals of each of said transistors being coupled to said second node;

a plurality of diodes connected in series with one another, said series being connected between said first node and said second node; and a current-variable resistive element being connected in series with at least one of said base terminals of at least one of said plurality of transistors by way of a node intermediate said series of diodes, said second terminals of each of said transistors being coupled to said first node, and said third terminals of said transistors being coupled to said opposite side of D.C. power supply.

16. A circuit for driving a lamp, comprising:

a magnetically permeable core;

a high voltage secondary winding wound around said core, said secondary winding being connectable to said lamp;

a first primary winding wound around said core, said primary winding having a first end and a second end;

a second primary winding wound around said core, said second primary winding having a third end and a fourth end, said third end being connected to said second end at a first node, said fourth end being connectable to one side of a D.C. power supply;

an R-C network connected between said first end and an opposite side of said D.C. power supply, said network including at least one resistor and one capacitor connected to one another at a second node;

a plurality of transistors connected in parallel with one another, each of said transistors including a base terminal, a second terminal and a third terminal, each of said base terminals of each of said transistors being coupled to said second node, said second terminals of each of said transistors being coupled to said first node, and said third terminals of said transistors being coupled to said opposite side of said D.C. power supply; and a plurality of current-variable resistive elements each in series with a respective one of said plurality of transistors.

* * * * *